United States Patent
Meng et al.

(10) Patent No.: US 9,025,736 B2
(45) Date of Patent: May 5, 2015

(54) AUDIO ARCHIVE GENERATION AND PRESENTATION

(75) Inventors: Fan Ping Meng, Beijing (CN); Yong Qin, Zhongguan Cun (CN); Qin Shi, Beijing (CN); Zhi Wei Shuang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1394 days.

(21) Appl. No.: 12/025,535

(22) Filed: Feb. 4, 2008

(65) Prior Publication Data

US 2008/0187109 A1    Aug. 7, 2008

(30) Foreign Application Priority Data

Feb. 5, 2007    (CN) .......................... 2007 1 0007010

(51) Int. Cl.
  *H04M 1/64*    (2006.01)
  *H04M 3/00*    (2006.01)
  *H04M 3/51*    (2006.01)
  H04M 3/42     (2006.01)

(52) U.S. Cl.
  CPC ........ *H04M 3/5166* (2013.01); *H04M 3/42221* (2013.01); *H04M 2203/2011* (2013.01)

(58) Field of Classification Search
  CPC ........................... G10L 15/1822; G10L 15/22
  USPC .................. 704/275; 709/206; 379/69, 88.01, 379/88.04, 88.13, 88.17, 265.09, 265.12
  See application file for complete search history.

(56) References Cited

U.S. PATENT DOCUMENTS

| | | | |
|---|---|---|---|
| 5,897,616 A * | 4/1999 | Kanevsky et al. ............. | 704/246 |
| 6,665,644 B1 | 12/2003 | Kanevsky et al. | |
| 6,850,603 B1 * | 2/2005 | Eberle et al. ................ | 379/88.16 |
| 6,944,592 B1 | 9/2005 | Pickering | |
| 7,076,427 B2 | 7/2006 | Scarano et al. | |
| 7,167,830 B2 * | 1/2007 | Sravanapudi et al. ........ | 704/275 |

(Continued)

FOREIGN PATENT DOCUMENTS

| CN | 1409247 | 4/2003 |
|---|---|---|
| JP | 02150156 | 6/1990 |

(Continued)

OTHER PUBLICATIONS

Office Action dated Jul. 31, 2012 received for Japanese patent application No. 2008-023432.

*Primary Examiner* — Lisa Hashem (74) *Attorney, Agent, or Firm* — Fleit Gibbons Gutman Bongini & Bianco PL; Jon A. Gibbons (57) ABSTRACT

A method, information processing system, and computer program storage product for automatically generating auditory archives in a customer service environment are disclosed. A communication link with an end user is established. An information form is retrieved. The information form includes at least a category choice information set and at least one audio recoding information set. The end user is prompted to answer a set of questions based on information in the information form. A data set associated with each answer to each question in the set of questions given by the end user is stored. The data is stored under a set of fields corresponding to a question. Each data set stored under the set of fields for each question in the set of questions are combined with each other. An audio archive file is generated including the data sets that have been combined.

20 Claims, 7 Drawing Sheets

(56) References Cited

U.S. PATENT DOCUMENTS

| | | | |
|---|---|---|---|
| 7,451,089 B1* | 11/2008 | Gupta et al. | 704/270.1 |
| 7,487,095 B2* | 2/2009 | Hill et al. | 704/275 |
| 8,494,854 B2* | 7/2013 | Gross | 704/246 |
| 2001/0013001 A1* | 8/2001 | Brown et al. | 704/270.1 |
| 2003/0125958 A1* | 7/2003 | Alpdemir et al. | 704/275 |
| 2003/0212561 A1* | 11/2003 | Williams et al. | 704/270.1 |
| 2004/0042591 A1* | 3/2004 | Geppert et al. | 379/88.01 |
| 2004/0107108 A1* | 6/2004 | Rohwer | 704/275 |
| 2004/0193403 A1 | 9/2004 | Creamer et al. | |
| 2005/0240411 A1 | 10/2005 | Yacoub | |
| 2005/0278177 A1 | 12/2005 | Gottesman | |
| 2006/0080107 A1 | 4/2006 | Hill et al. | |
| 2007/0081520 A1* | 4/2007 | Da Palma et al. | 370/352 |
| 2007/0203708 A1* | 8/2007 | Polcyn et al. | 704/270.1 |
| 2008/0118051 A1* | 5/2008 | Odinak et al. | 379/265.09 |
| 2009/0006083 A1* | 1/2009 | Bachand | 704/201 |
| 2010/0166158 A1* | 7/2010 | Costello et al. | 379/88.04 |
| 2010/0185449 A1* | 7/2010 | Wu et al. | 704/275 |
| 2010/0332287 A1* | 12/2010 | Gates et al. | 705/10 |
| 2014/0052480 A1* | 2/2014 | Bell et al. | 705/4 |

FOREIGN PATENT DOCUMENTS

| | | |
|---|---|---|
| JP | 9018552 | 1/1997 |
| JP | 1168932 | 3/1999 |
| JP | 2000115405 | 4/2000 |
| JP | 2002057693 | 2/2002 |
| JP | 2002281469 | 9/2002 |
| JP | 2004129168 | 4/2004 |
| JP | 2004200865 | 7/2004 |
| JP | 2007028266 | 2/2007 |

\* cited by examiner

AUDIO ARCHIVE GENERATION AND PRESENTATION

CROSS-REFERENCE TO RELATED APPLICATIONS

This application is based upon and claims priority from a prior Chinese Patent Application No. 200710007010.8, filed on Feb. 5, 2007, the entire disclosure of which is herein incorporated by reference in its entirety.

FIELD OF THE INVENTION

The invention generally relates to auditory archive processing, and particularly, relates to a method and system for automatically generating auditory archive and a method and system for providing auditory archive.

BACKGROUND OF THE INVENTION

A call center, also called a customer service center, refers to a system that synthetically utilizes advanced communication and computer technologies for optimizing and managing information and material flow. A call center can collectively achieve communication, service, and product guidance. A staff member of a call center is usually referred to as a customer service representative. A call center may include hundreds or even thousands of customer service representatives. A smaller more economic call center may include a much smaller number of customer service representatives. The size of a call center can be determined based on the needs of the business providing support.

A call center is beneficial for the following reasons. 1. User abilities: A user's listening and speaking abilities are need to be taken into consideration at the call center. This is true whether a caller is an elderly person or a child interacting with a human representative of interacting with an automated voice system. 2. Cost savings: A call center can collectively accomplish the transfer of voice and data. A user may simply acquire the data in by accessing a database via voice prompts. This effectively reduces the length of each phone call. Also, each customer service representative may be able to handle more phone calls in a limited time period, thereby significantly improving the efficiency of phone handling and the utilization ratio of the phone system. 3. Extended hours of operation: A call center is able to offer services continuously for 24 hours every day. This allows a user to obtain information quickly and efficiently through a telephone for solving a current problem. 4. Improving quality of customer service: A call center has a user-friendly interface that can offer helpful customer service support. Due to the improvement of phone handling the time period that a user has to wait online is greatly reduced. As soon as a user call is received, a call center system can extract and send relevant information to a terminal of a customer service representative. This routing procedure can be based on the caller's number or the called number. Thus, a customer service representative obtains large amounts of relevant information related to the user, thereby simplifying the phone handling procedure.

Services provided by call centers are very important for corporations. However, these services generally remain labor intensive. Call centers employ more than 6 million people in North America alone and the number is expected to rise to 12 million by 2010. Even estimating the average yearly salary of an customer service representative of a call center as low as $20K results in over $120B/year is being spent on call center labor on average. For some large companies like International Business Machine ("IBM") corporation, America, it may have more than 40,000 customer service representatives facing its customers through call centers. This represents an unacceptably high fraction of IBM's total employee population. According to the statistical information nearly 80-90% of the cost of call center based services is human labor cost. Current call center implementations have not provided a substantial reduction in costs.

Current call centers generally operate as follows. A user dials in and a customer service representative holds a conversation with the user. The customer service representative rapidly records the problem indicated by the user. According to the recorded problem, the representative gives a solution to the user or further researches the problem. For example, the representative can submit the support request a high-level department or forward it to a professional. Since the information recording is usually completed manually by a customer service representative, the integrity, continuity, and consistency of the recorded information cannot be guaranteed.

Thus, when the recorded information is forwarded to a professional, critical information may be missing or contain erroneous data. This can result in repetitive problem confirmation or a non-effective effort. Some call centers record a user's call during the entire transaction. However, the recordings are mainly used for monitoring the service of quality associated with customer service representatives and for serving as evidence in the case of a complaint. The recordings are not classified, retrieved, or combined for summarizing. Therefore, a call center implemented as such is not able to effectively reduce human labor cost and improve efficiency technically.

In another implementation of a call center, a user's call is recorded during the transaction and is then transcribed using speech-to-text technology. This may solve some of the problems of the previous example, but speech-to-text technologies, are unpredictable. The recognition error rate is extremely high, and the transcription accuracy is very low. This results in most of the transcribed text to be unreadable and not useful for customer service purposes.

SUMMARY OF THE INVENTION

Two important functions of all principal services of a call center are to process customers' complaints and solve a customer's problem. For these two functions, an auditory archiving of a customer's problems, addresses, contact information, and the like is very useful. However, since the contents are very diverse, current speech to text transcription technologies do not achieve very accurate results when transcribing speech. Currently these functions are supported manually by customer service representatives. Thus, in order to reduce human labor costs of a call center, embodiments of the present invention overcome these problems associated with current call center solutions. In particular, embodiments of the present invention provide an automatic solution for various services of a call center and provide a more efficient and effective call center.

Briefly, in accordance with the present invention, disclosed are a method, information processing system, and computer program storage product for automatically generating auditory archives in a customer service environment. The method includes establishing a communication link with an end user. An information form is retrieved. The information form includes at least a category choice information set and at least one audio recoding information set. The end user is prompted to answer a set of questions based on information in the information form. A data set associated with each answer to each question in the set of questions given by the end user is stored. The data is stored under a set of fields corresponding to a question. Each data set stored under the set of fields for each question in the set of questions are combined with each other. An audio archive file is generated including the data sets that have been combined.

In another embodiment, an information processing system for automatically generating auditory archives in a customer service environment is disclosed. The information processing system includes a memory and a processor that is communicatively coupled to the memory. The information processing system also includes an Interactive Voice Response ("IVR") module communicatively coupled to the memory and the processor. The IVR module is adapted to retrieve an information form. The information form comprises at least a category choice information set and at least one audio recoding information set. The end user is prompted to answer a set of questions based on information in the information form. A data set associated with each answer to each question in the set of questions given by the end user is stored. The data is stored under a set of fields corresponding to a question. Each data set stored under the set of fields for each question in the set of questions are combined with each other. An audio archive file is generated including the data sets that have been combined.

In yet another embodiment, a computer program storage product for automatically generating auditory archives in a customer service environment is disclosed. The computer storage product includes instructions for retrieving an information form. The information form includes at least a category choice information set and at least one audio recoding information set. The end user is prompted to answer a set of questions based on information in the information form. A data set associated with each answer to each question in the set of questions given by the end user is stored. The data is stored under a set of fields corresponding to a question. Each data set stored under the set of fields for each question in the set of questions are combined with each other. An audio archive file is generated including the data sets that have been combined.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Figure 7:
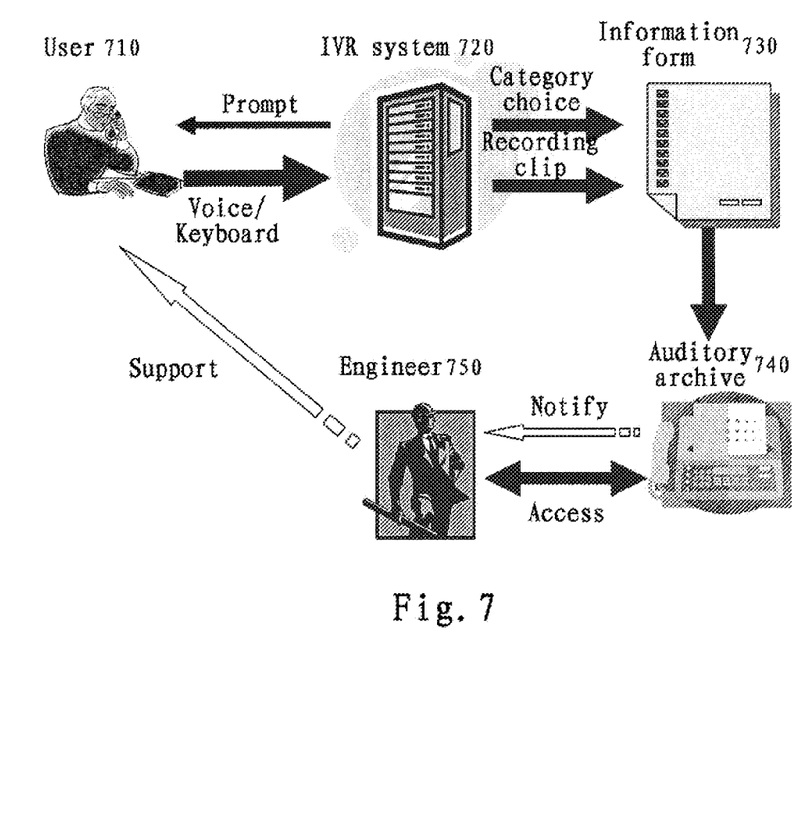
FIG. 7 is a schematic diagram illustrating the overall operation of a method and system for generating auditory archives and for providing auditory archives according to an embodiment of the present invention.

Embodiments of the present invention provide a system and method for automatically generating auditory archives 740 and providing those archives 740 to a customer service representative 750. Through embodiments of the present invention, an auditory archive 740 is automatically generated based on a voice interaction with a user 710 (e.g., a caller/customer). The auditory archive 740 includes key information related to the user 710, such as problem category, problem description, address, contact information, and the like. With respect to certain functions of a call center, such as the handling of customer complaints and solving customer problems, the embodiments of the present invention process these functions in an automatic and effective way. This allows for the number of human representatives of the call center to be reduced. Thus, embodiments of the present invention may greatly reduce the cost of the call center, while overcoming the deficiencies and problems of current call centers.

Figure 1A:
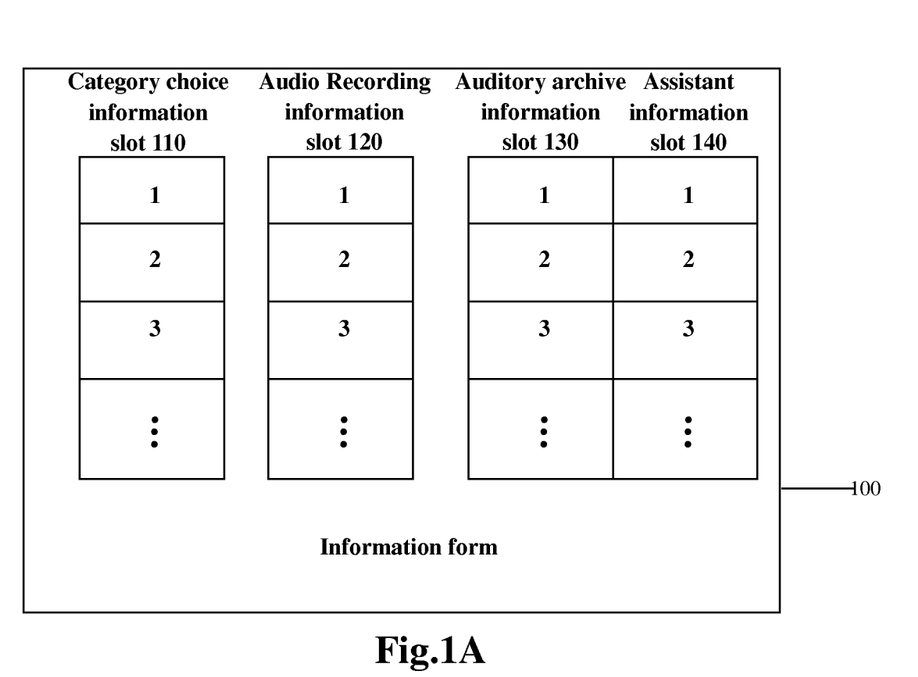
FIG. 1A is a block diagram illustrating an information form according to an embodiment of the present invention.

The auditory archive 740 generated, in one embodiment, is implemented based on an information form 100. Prior to discussing embodiments of the present invention in detail, an information form 100 is discussed with respect to FIG. 1A. FIG. 1A, shows an information form 100 according to an embodiment of the invention. The information form 100 comprises three information slots: a category selection information slot 110, an audio recording information slot 120, and an auditory archive information slot 130.

The category choice information slot 110 and the audio recording information slot 120 are used for collecting information entered by a customer 710. The auditory archive information slot 130 is optional, and is generated by combining the information in the category choice information slot 110 and the audio recording information slot 120.

Additional slots such as one or more assistant information slots 140 can also be included in the information form 100. Examples of an assistant information slot 140 are a time tag information slot, an index information slot, and the like. Each assistant information slot 140 is associated with a corresponding auditory archive information slot 120. In this way, when the auditory archive information slot 130 is accessed, the assistant information slot 140 is utilized to retrieve information from the auditory archive information slot 120 for providing more relevant information to a customer service representative 750. For example, specific identification information may be added to each information slot in the information form 100 for facilitating information retrieval and editing. Description information, in one embodiment, may be added to various information slots (such as the category choice information slot 110 and the audio recording information slot 120) in the information form 100. The description information can be used for generating voice prompt information for interaction with a user 710.

The information form 100, in one embodiment, is stored as a single information unit in a database. Each information slot is stored as a data element of the information unit. The information form 100 may be stored in a file format that is predefined by a developer. For example, each information form 100 can be stored as a single file or all information forms may be stored as a single large file.

The category choice information slot 110 in the information form 100, in one embodiment, is used for collecting information associated with a user's service category selection. One important feature of such information is that all possible choices belong to a specific set of choices, and these choices may be enumerated one by one. Such a choice set can be configured by a service provider in advance. A user 710, in one embodiment, makes his/her service choice selection from a choice set. One advantage is that, for speech recognition of a limited set, a comparatively high precision can be obtained.

The size of a service choice set is generally not very large, as the size of the set partially affects the precision of speech recognition. In general, if the number of choices in a set is less than 100, the recognition rate can exceed 95% or even approach to 100%. In comparison, the accuracy of speech recognition without a defined scope is much lower. Therefore, the category choice information in a particular set is of great benefit to the information management and task dispatch in a later stage.

An example of a service choice is a set of repair service categories supported by a call center such as gas heater repair, cable television repair, water supply repair, and electrical repair. A method for storing such information can utilize: 1) text storage, such as directly storing the text "gas heater repair"; 2) encoding storage, such as, "01" represents gas heater repair, "02" represents cable television repair, and the like. In the embodiment where encoding storage is utilized, a corresponding table of encodings and particular service categories is also used. In some embodiments, the encoding storage embodiment saves storage space and improves retrieval speed as compared with a direct text storage system.

The audio recording information slot 120 in the information form 100, in one embodiment, is used for storing recorded audio clips of a user 710 interacting with the call center. The audio recording information slot 120 is mainly used for collecting information that is difficult to enumerate one by one in a smaller set, such as user's detailed problem description, user's name, user's detailed home address, and the like. In general, it is difficult to properly recognize such information with current speech recognition technologies. However, if the above information can in fact be accurately recognized using speech recognition, the audio recording information slot 120 may not be needed.

The storage manner of such information may employ common speech information storage methods such as 1) un-compressed storage, such as un-compressed storage in the format of PCM or Wave; 2) compressed storage, such as the compression storage manner with the encoding of G.723.1 or AMR. The compressed storage method may save storage space, but requires the information to be decoded when speech restoration is needed. Decoding can affect operational efficiency depending on the size of the file and the type of compression used.

A plurality of audio recording information slots 120 can exist in the information form 100, wherein each audio recording information slot 120 records a small section of specific information. Using the specific identification information and description information of the recorded audio clips, various audio clips can be combined, sorted, and the like upon customer service representative 750 requirements.

The auditory archive information slot 130 in the information form 100 is used for storing the auditory archives 740 generated by combining the collected information. A plurality of auditory archive information slots 130 can reside in the information form 100. These auditory archive information slots 130 are used for storing the auditory archives 740 corresponding to each category in the category choice information slot 110 and the specific information recorded in the audio recording information slot 120.

Figure 1B:
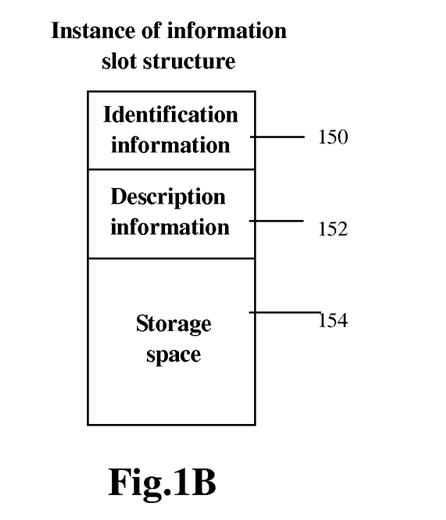
FIG. 1B is a block diagram illustrating an instance of an information slot structure according to an embodiment of the present invention.

Referring now to FIG. 1B, an instance of an information slot structure in the information form 100 is shown according to an embodiment of the invention. The information slot may be any one of the information slots in the information form 100. The structure of the information slot comprises identification information 150, description information 152, and storage space 154. The identification information 150 is a unique identifier associated with the information slot. The unique identifier facilitates storage and retrieval. The description information 152 comprises information that describes the information slot to a user. The storage space 154 is used for storing the information corresponding to the information slot, which may be, for example, text information, audio recording, and the like.

It is noted that FIG. 1A and FIG. 1B are only illustrative and do not limit the structure and representation of the information form 100. The information form 100 may be designed and modified in various ways other than what has been shown in FIGS. 1A and 1B.

Unlike a conventional call center employing speech to text transcription, embodiments of the present invention generate an auditory archive 740 based on the customer recording.

Figure 2:
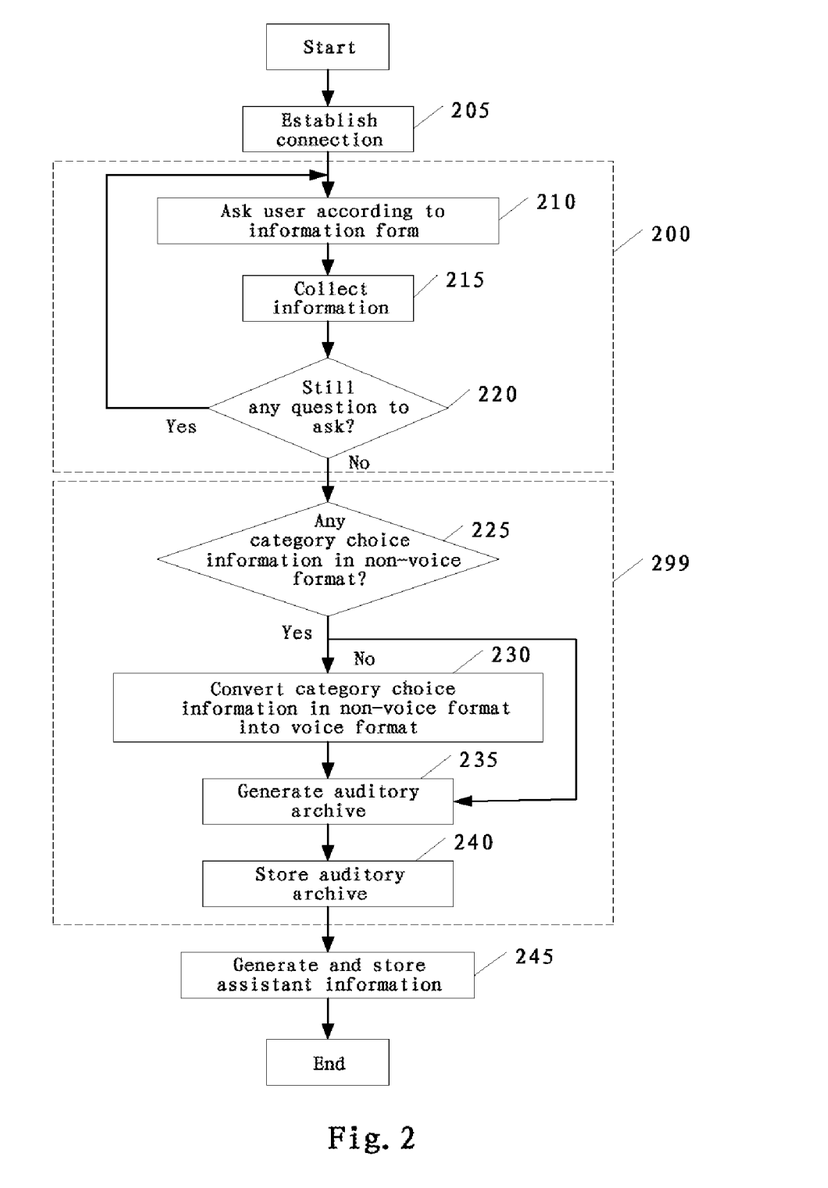
FIG. 2 is an operational flow diagram illustrating a process of automatically generating an auditory archive according to an embodiment of the present invention.

Referring now to FIG. 2, an operational flow diagram illustrating a process of automatically generating an auditory archive 740 is shown. The process of FIG. 2 comprises two overall steps: step 200 of asking a user 710 one or more questions or prompting a user 710 to give specific information based an information form 100 and collecting the information; and step 299 of generating an auditory archive 740.

In particular, a user 710, at step 205 establishes a connection with a call center, and interacts with a real-time Interactive Voice Response ("IVR") system 720. A user 710 can establish the connection by, for example, placing a phone call, through the Internet, and the like.

The IVR 720, at step 210, asks the user 710 questions or prompts the user 710 to give information according to an information form 100. The IVR 720, at step 215, collects the user's service category choice information and records all or part of the user's responses. Since the information form has been designed in advance, e.g. the information form 100 in FIG. 1A, embodiments of the present invention can populate the information slots in the information form 100 by the real-time IVR's interaction with the user 710 according to the information form 100. Step 200 may be further subdivided into several steps, as described in detail hereinafter.

In particular, the IVR 720, at step 210, asks the user 710 a question according to the information form 100. Each question corresponds to one of the category choice information slots 110 or one or more audio recording information slots 120 in the information form 100.

The category choice information slot 110 can be populated by prompting the user 710 to make a choice via voice or keyboard. For example, consider again the above example of a call center associated with repair services. The IVR 720 can prompt, via an automated voice, the user 710 to select a repair category by pressing a key. For example, the IVR system 720 can prompt the user 710 "Press 1 for gas heater repair, press 2 for cable television repair, press 3 for water supply repair, and press 4 for electrical repair." Alternatively, the IVR 720 can prompt the user 710 to input repair category via a voice command. For example, the IVR system 720 can prompt the user 710 "You may speak out: gas heater repair, cable television repair, water supply repair, or electrical repair". The user 710 can interrupt the voice prompt at any time during the process and make a direct input.

Alternatively, both input mechanisms (voice and key pressing) may be supported simultaneously. For example, the IVR system 720 can play the following prompt to the user 710: "You may press a key to choose a number or speak the number: 1. gas heater repair, 2. cable television repair, 3. water supply repair, 4. electrical repair". The prompting process of the IVR 720 is not limited to the above examples where a voice prompt is used to prompt the user 710. Other prompting methods may also be used such as a user manual, or prompting by way of characters presented instantly with a visual apparatus.

For the audio recording information slot 120, the general prompt manner is to prompt the user 710 to speak out the specific requested information. For example, the IVR system 720 can play the following prompt to the user 710: "Please speak out your address after the beep" or "Please speak out a description of your problem after the beep". It should be noted that the above prompts are only exemplary and do not limit the present invention in any way.

The IVR 720, at step 215, collects the information entered or spoken by the user 710. For example, the IVR 720 collects the category selection information and stored in the category choice information slots, and user audio clips are collected and stored within the audio recording information slots 120. If a key-pressing method is utilized by a user 710 for inputting information for a category selection the entered numbers transmitted by the telephone keypad are captured and stored in the category choice information slot 110. If a voice inputting method is used by a user 710 for a service category selection information slot 110, and when the audio recording information slot 120 is filled in, the spoken responses of the user 710 are recorded. When an input from a user 710 is a voice input the IVR 720 can invoke a speech recognition engine for automatically detecting the speech section and silence. The IVR 720 can select only the speech section for storing. Alternatively, the IVR 720 may also prompt the user 710 to press a specific key (such as the "#") to explicitly specify the starting and ending point of the speech section when the user 710 starts or ends speaking. Afterwards, the collected voice information is stored in the category choice information slot 110 or the audio recording information slot 120.

In an embodiment where the final generated information form is stored on a remote server, the IVR 720 may adopt a caching mechanism to rapidly collect information. For example, a temporary information form can be stored locally at the IVR 720, which is set up during the IVR's 720 interaction with the user. During the interaction process or after the completion of the interaction process, the temporary information form and the information form on the remote server are synchronized. Further, in some embodiments in which it is needed to store the voice information after compressing, the IVR 720 may temporarily store the collected voice information in a local temporary information form in an un-compressed manner. This helps avoid time delay experienced by voice compression. Thereafter, during the synchronization process with the server, the voice compression, and storage is performed.

The IVR 720, at step 220, determines if additional questions/prompts remain in information form 100. If the result of this determination is positive, the control flow returns to step 210 for continuing to ask the user 720 for the name, home address, contact number, and the like. If the result of this determination is negative, the control flow proceeds to the auditory archive generation flow of step 299. The auditory archives 740 are generated by combining the collected information as discussed in greater detail below.

The IVR 720, at step 225, determines if any category choice information collected at step 215 is in a non-voice format. If the result of this determination is positive, the control flows to step 230, in which the collected category choice information in a non-voice format is converted into voice format. For example, the information can be converted into voice by means of a Text to Speech ("TTS") system. With respect to category choice information stored using an encoded storage method; the encoding information is converted into the corresponding text prior to using the text to speech technology. Furthermore, the category choice information can be replaced with the corresponding voice information by means of prerecorded audio clip. Note that step 230 is optional. In the case that all information is collected in voice format, this step could be skipped.

If the result of the determination at step 225 is negative, the control flows to step 235. The IVR 720, at step 235, generates an auditory archive 740. It should be noted that even if step 230 is not performed, the category choice information and the audio recording information are converted in to a voice format for generation of the auditory archive 740. The IVR 720 creates an auditory archive 740 by combining the category choice information and the audio recording information in voice format in a particular sequence. For example, the category choice information may be followed by the audio recording information. Also the audio recording information such as user's address, telephone number, can be presented followed by the category choice information, then the remaining audio recording information. The sequence of combining the information for generating the auditory archive 740 is predetermined or specified by the customer service representative 750 requesting the information.

During the process of generating the auditory archive 740, it is possible to utilize additional information to provide a better user experience for the potential information requester 750. For example, with respect to the category choice information corresponding to service category, the following audio information can be added in: "The service category the user chose is:" Moreover, in some embodiments, appropriate background music may be added in, to improve the user experience. Moreover, in some embodiments, redundant voice information (e.g., long-time silence in the middle of the user speech recording) may be deleted to shorten the length of the auditory archive 740, so as to improve storage and retrieval efficiency. The deletion of silence in is performed with a silence detection technology, which is a common technology in the field of speech recognition, and is not discussed in detail.

The generation of the auditory archive 740 can result in various auditory archive formats. For example, with respect to a degree of auditory archive detail, the archive 740 can be classified as: detailed mode, normal mode, and simplified mode. The auditory archive 740 in the detailed mode comprises the full prompt information. The auditory archive 740 in the normal mode comprises part of the prompt information. The auditory archive 740 in the simplified mode does not comprise any additional prompt information. Also, the customer service representative 750 may define a different playback order; for example, an address-first mode can be defined, in which the address information is placed at the beginning. A problem-first mode can also be defined, in which the problem description is placed in the beginning. The objective of self-defining order is to meet the requirements of different information requesters.

The IVR 720, at step 240, stores the generated auditory archive 740 in the auditory archive information slot 130 in the information form 100. The auditory archive 740 may also be regenerated each time information is retrieved. However, doing so is time-consuming and slows information retrieval. The different forms of auditory archives 740 may be stored in the different auditory archive information slots 130.

After completing the overall step 299 of generating auditory archive, the IVR 720, at step 245, generates and stores assistant information. Whether or not to generate such information is dependent on whether an assistant information slot 140 corresponding to the auditory archive information slot 130 is included when designing the information form 100. For example, if a time tag information slot is designed in the information form 100, then at the same time of generating an auditory archive, the time tag information corresponding to each audio recording of the auditory archive is also generated. For example, "12s: detailed address information" denotes that the detailed address information is played at the 12th second, while "46s: detailed problem description" denotes that the detailed problem description is played at the 46th second.

The time tag information is used for supporting the jumping among the sound clips in the generated auditory archive 740. The time tag information can be calculated by accumulating the lengths of all audio recordings prior to the audio recording corresponding to it. For example, if an index information slot is designed in the information form 100, then at the same time of generating an auditory archive, the index information corresponding to each audio recording of the auditory archive is generated. Note that a sound clip in the auditory archive comprises the user's audio recordings and the category choice information that has been converted into voice format.

The index information is also used for supporting the jumping among the sound clips in the generated auditory archive. The index information can be generated in terms of recording order. For example, "1: detailed address information" denotes that the 1st sound clip is the detailed address information, while "2: detailed problem description" denotes that the 2nd sound clip is the detailed problem description. Note that the denotations of above time tag information and the index information are only illustrative, and various different denotation manners are apparent to those skills in the art. Preferably, a specific identification may be further added to each information slot to facilitate information retrieval and editing.

To help to better understand embodiments of the present invention, a simplified example is given below. It is noted that this example is only illustrative, and in an actual implementation, the collected information may be different from that of the following example. The following example shows the dialog between a user and a call center after a connection has been established:

Q: Welcome to call the service center of Company ABC. What can I do for you, please?
A: Gas heater repair.
Q: What is your home address please?
A: Room 1201, Building 1, No. 10 Happiness road.
Q: What is your name please?
A: Tom.
Q: Please describe your trouble:
A: There is a water leak in the pipe of my gas heater.
Q: Please enter your contact number:
A: 12345678 (inputted by way of user key-pressing).

An example of the auditory archive generated according to the collected user information after the above voice interaction is shown below, wherein all contents have been converted into voice format:

Customer's category selection: gas heater repair.
Customer's details: Tom; Room 1201, Building 1, No. 10 Happiness road; there is water leak in the pipe of my gas heater.
Customer's contact number: 12345678.

It can be seen from the above example that the information that the user entered via touchpad or voice is converted into voice if needed, and the necessary voice description information is added in front of each of customer information set. Therefore, a simplified auditory archive 740 is generated, which comprises all customer information without information loss. Meanwhile, the customer information is categorized and combined as necessary to facilitate future retrieval and access.

It is noted that the above embodiment with respect to FIG. 2 is only illustrative and without departing from the spirit of the invention, some steps may be added or deleted, or some steps therein may be combined together or further divided into several steps, wherein all of the method steps are falling within the protection scope of the present invention.

In one embodiment, the automatically generated auditory archive 740 is provided to a customer service representative 750 (e.g. engineer) requesting the information for enabling the representative 750 to obtain relevant information. The generated auditory archive 740 can be relayed to the representative 750 via information asking/requesting and/or information dispatching.

The information requesting embodiment comprises receiving a request from the representative 750 for an auditory archive 740. This request is sent to the IVR 720 by the requestor's own initiative. In one embodiment, this request can be made through a voice channel (such as land phone, mobile phone, etc.).

Figure 3:
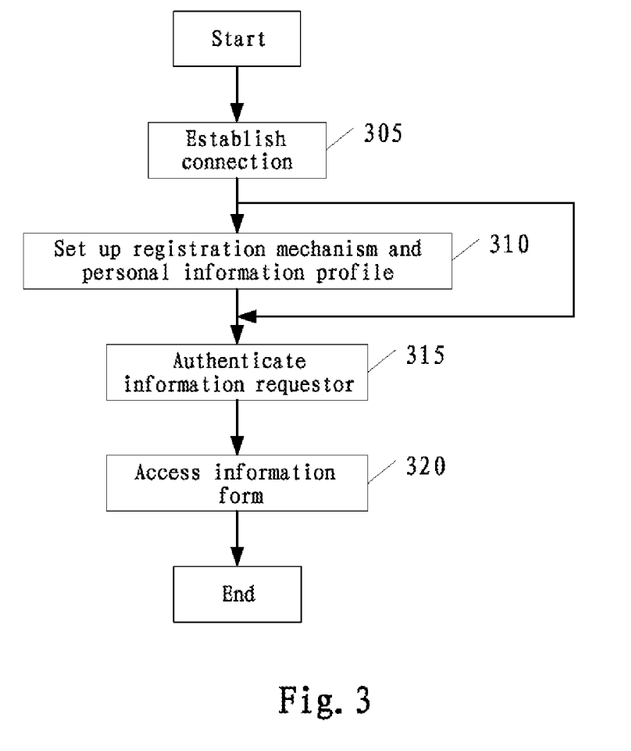
FIG. 3 is an operational flow diagram illustrating a process of providing an auditory archive in the form of information asking according to an embodiment of the invention.

FIG. 3 is an operational flow diagram illustrating a process of relaying auditory archive information to a representative 750 in response to an information request received from the representative 750. In particular, the process of FIG. 3 starts at step 305, in which a representative 750 establishes a connection with a call center. The connection can be made, for example, via a phone call, accessing through Internet, or the like The IVR 720, at step 310, registers the representative 750 and assigns a personal information profile to the representative 750 if one does not already exist. Once the representative 750 is registered (if not already registered) the representative 750 is assigned a username and a password. The personal information profile assigned to the registered representative 750 is used by the IVR 720 to storing the representative's access rights and personal default settings. Note that step 310 is only needed to be performed when the representative 750 logs into the call center the first time and may be skipped after completing the registration.

The IVR 720, at step 315, authenticates the representative 750 when a request for auditory archive information is received from the representative 750. For example, the representative 750 can be prompted to enter his/her username and the password. Only an authenticated information representative 750 can access the auditory archive 740 corresponding to his/her access right. After being authenticated, the personal information profile of the representative 750 is analyzed to determine any personal default settings.

The representative 750 after being authenticated, at step 320, access the information form 100, thereby accessing a corresponding auditory archive 740.

With respect to the information dispatching embodiment, the IVR system 720 automatically dispatches information to corresponding registered representative 750. A dispatch can be made via any communication technology such as a multimedia message, email, telephone message, and the like.

Figure 4:
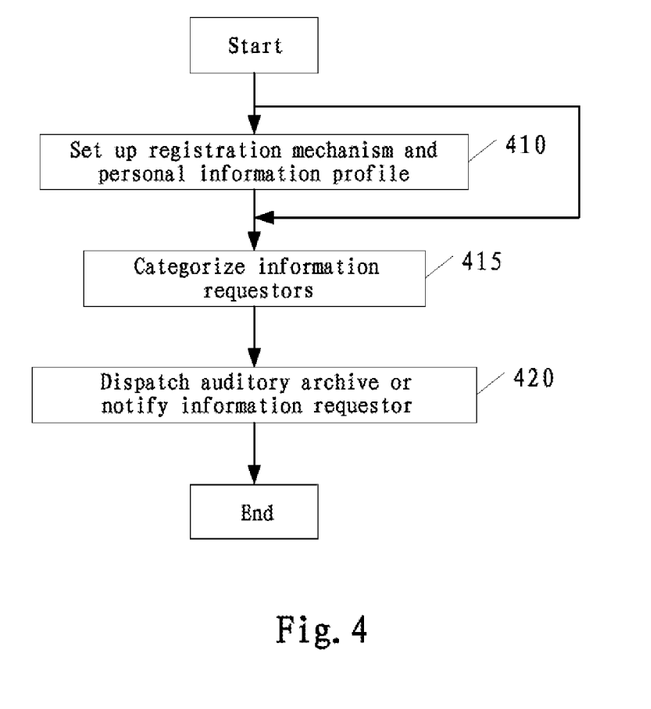
FIG. 4 is an operational flow diagram illustrating a process of providing an auditory archive in the form of information dispatching according to an embodiment of the present invention.

FIG. 4 is an operational flow diagram illustrating one example of an information dispatching process according to an embodiment of the invention. The operational flow diagram of FIG. 4 begins at step 410. The IVR 720, at step 410, registers an information representative 750 and configures a personal information profile similar to the embodiment discussed above. Once the representative 750 is registered (if not already registered) the representative 750 is assigned a username and a password. The personal information profile assigned to the registered representative 750 is used by the IVR 720 to store the representative's access rights and personal default settings. Note that step 410 is only needed to be performed when the system is set up, and will be skipped afterwards.

The IVR 720, at step 415, categorizes the representatives 750. For example, the representatives 750 may be organized, in terms of service categories such as: gas heater repair, cable television repair, water supply repair, electrical repair, and the like. In another example, the representative 750 can be classified, in terms of service scale, as: large-scale, medium-scale, small-scale, etc. In yet another example, the representatives 750 can be organized, in term of customer approval degree, as: good, medium, poor, etc. These categories may be generated automatically or set manually. In some circumstances, such as when there is only one representative 750 or the system randomly dispatches information to any one of all representatives 750, the above step does not have to be performed.

The IVR 720, at step 420, dispatches a generated auditory archive 740 directly to the corresponding representative 750. The IVR 720 can also notify the corresponding representative 750 that a corresponding auditory archive 740 has been generated. The representative 750 can then access the IVR 720 as discussed above.

When an information dispatch is performed, dispatching policies can be employed. For example, according to the service category choice information stored in the information form 100, the representative 750 of the corresponding category is selected. In another example, the information is dispatched to the representative 750 with a better customer approval degree. These policies may be added, modified, and deleted by a user with administrator rights.

The dispatched information can directly include the auditory archive 740. For example, the dispatched information and auditory archive 740 can be sent via a multimedia message, or it can be dispatched as a section of text information together with a specific telephone number and a password. This allows a representative 750 who received the information to obtain the corresponding information by dialing the telephone number and entering the corresponding password.

In either embodiment for providing auditory archives 740 (information requesting or information dispatching) the representative 750 can quickly retrieve the information he/she desires most by specifying various constraint conditions. The category choice information stored in the information form 100 may provide significant convenience for quick information retrieval.

Such a process can be completed by interacting with the IVR system 720. Similar to embodiment where a customer 710 is prompted a representative 750 can also be prompted by the IVR system 720. For example, the IVR 720 can play the following prompts: "You may press a key to choose a number or directly speak out: 1. gas heater repair, 2. cable television repair, 3. water supply repair, 4. electrical repair". The IVR 720 retrieves the corresponding information form 100 upon the choice of the representative 750. For example, the information form 100 stored in a database format may employ an SQL language to conduct conditional constraints for quick retrieval.

The representative 750 can select or predefine a desired auditory archive method in his/her profile. For example, the representative 750 can choose the detailed mode, normal mode, or simplified mode from the existing auditory archive modes. The representative 750 may self-define auditory archive modes. The auditory archive modes may be stored in his/her personal information profile. The representative 750 can further set a default auditory archive mode to avoid having to always make a selection every time the representative 750 logs into the IVR 720.

The representative 750 can also the play order of the various audio clips in the auditory archive 740. For example, if the representative 750 is particularly concerned with a user's address, the detailed address information can be placed at the beginning of the recording in order to save time.

When an auditory archive 740 has been stored in the information form 100, the IVR 720 directly plays the corresponding auditory archive 740. For the case that an auditory archive 740 has not been stored in the information form 10, the IVR 720 generates and plays the required auditory archive 740 in real time. Such auditory archives 740 can be stored in the information form 100. However the archives 740 are not required to be stored depending on any predefined policies.

The retrieved auditory archive 740 is being played back to the representative 750 in a voice format. In a multi-mode environment, the assistant information such as text information may also be presented to the representative 750 simultaneously. The representative 750 can control the jumping among various audio clips in the auditory archive 740. The common jumping commands are, for example, forwarding a specific time period or rewinding a specific time period. When time tag information corresponding to various audio clips in the auditory archive 740 has been generated, the representative 750 may jump to a certain audio clip through a voice command or key-stroke. For example, the representative 750 may speak out: "Detailed address information" to jump to the corresponding location of the detailed address information (e.g. at the 12th second) and play it.

Figure 5:
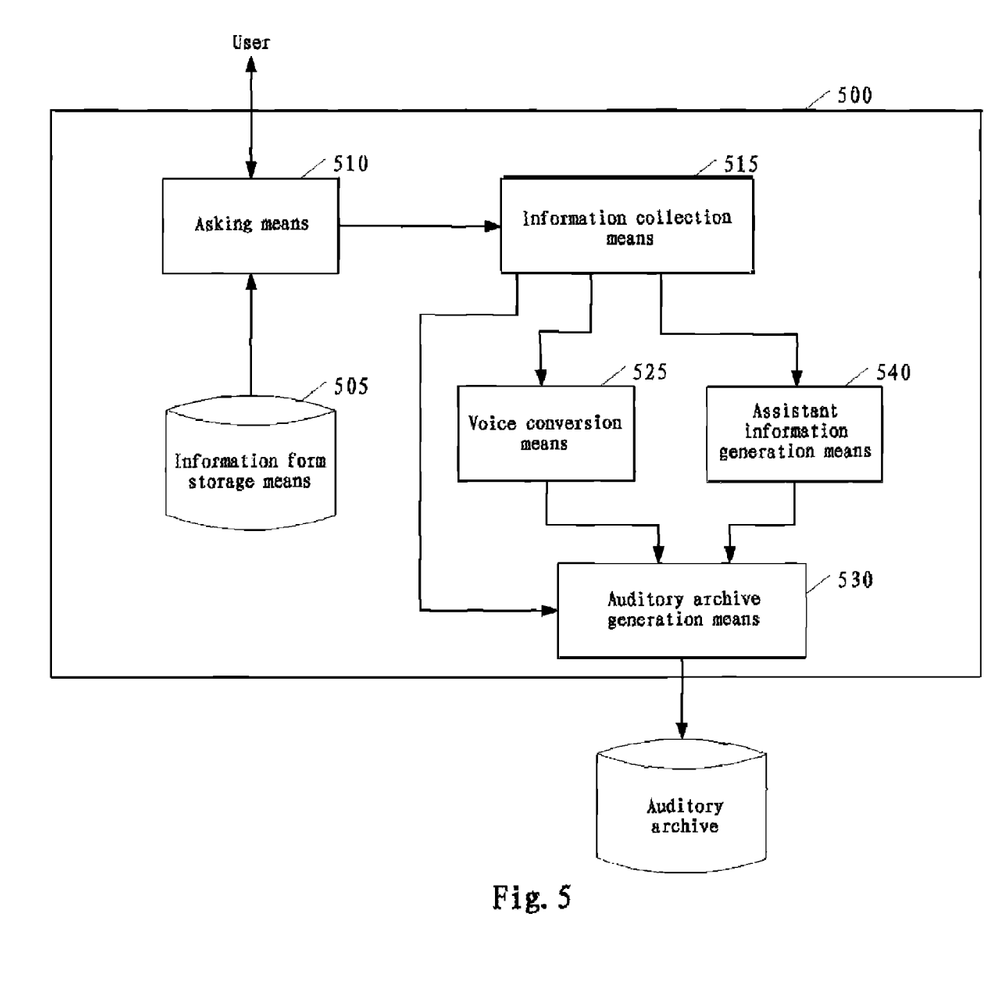
FIG. 5 is a block diagram illustrating a system for automatically generating auditory archives according to an embodiment of the present invention.

Referring now to FIG. 5, a system 500 for automatically generating auditory archives 740 is shown according to an embodiment of the invention. The system 500 includes an information form storage means 505, an asking means 510, an information collection means 515, a voice conversion means 525, an auditory archive generation means 530, and an assistant information generation means 540. The information form according to embodiments of the present invention, such as the information form 100 shown in FIG. 1A, is stored in the information form storage means 505.

The asking means 510 asks a user 710 questions or instructs the user to enter information according to the information form 100 stored in the information form storage means 505. Each question corresponds to one of the category choice information slots 110 (FIG. 1A) or one or more audio recording information slots 120 (FIG. 1A). With respect to the category choice information slot 110, it may be populated by prompting the user 710 of making choice with voice or keyboard. For the audio recording information slot 120, the general prompting process is to prompt the user 710 to speak out the requested information. The above prompting processes have been discussed above in greater detail.

The information collection means 515 is used for collecting a user's information. For example the information collection means 515 is used to collect a user's category choice information with the category choice information slots and a user's audio recordings with one or more audio recording information slots. According to the different user inputting mechanisms (e.g., key-pressing, voice inputting, and the like.) the information may be captured and stored in the specific information slots in the information form 100.

The voice conversion means 525 converts the collected category choice information in a non-voice format into a voice format. If all of the information is collected in a voice format, the voice conversion means 525 does not perform a conversion. The auditory archive generation means 530 combines the category choice information and the audio recording information in voice format in a particular sequence. The sequence can be predetermined or specified by the representative 750 or administrator. During the process of combining and generating the auditory archive 740, it is possible to add in additional information for providing a better user experience to the potential representative 750.

The generation of the information can result in various formats. For example, in terms of the detail degree, the audio archive 740 can be classified as: detailed mode, normal mode, and simplified mode. The description of the information and mode is similar to what has already been discussed above. The representative 750 can define different information orders. The objective of a self-defining order is to meet the requirements of different information requesters. The generated auditory archive 740 is stored in the auditory archive information slot 130 in the information form 100 residing in information form storage means 505. The different forms of auditory archives 740 may be stored in the different auditory archive information slots 130.

The assistant information generation means 540 generates and stores other assistant information, such as time tag information and index information. Whether or not to generate such assistant information is dependent on whether a corresponding assistant information slot 140 is designed when designing the information form 100. Preferably, a specific identification may be further added to each information slot to facilitate information retrieval and editing. The generated information is stored in the corresponding assistant information slot 140 in the information form 100.

Figure 6:
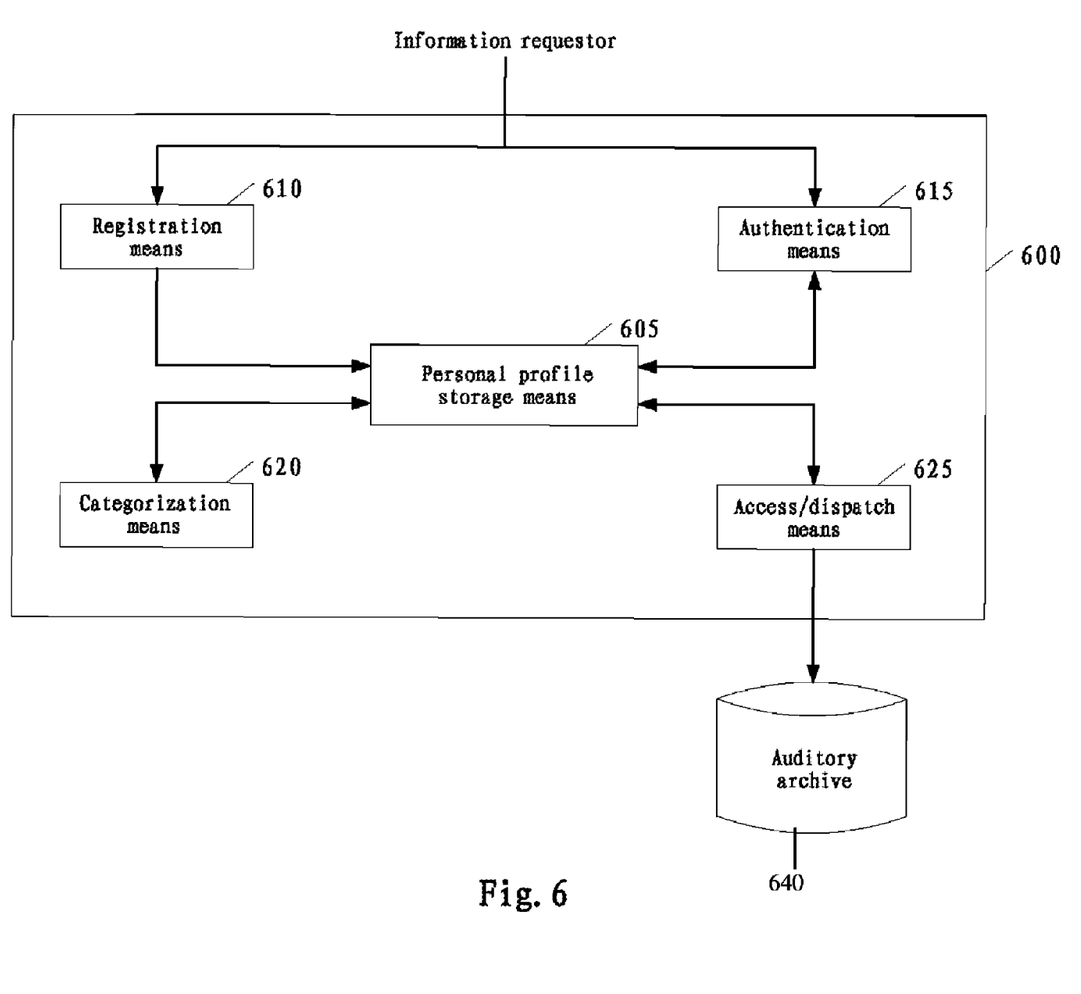
FIG. 6 is a block diagram illustrating a system for providing auditory archives according to an embodiment of the present invention.

FIG. 6 shows a system 600 for transmitting (e.g., information requesting and information dispatching) audio archive information to a requesting representative 750. Referring now to FIG. 6, a system 600 for providing auditory archiving is shown according to an embodiment of the invention. The system 600, in one embodiment, comprises a personal profile storage means 605, a registration means 610, an authentication means 615, a categorization means 620, and an access/dispatch means 625.

The personal information profiles of the representative 750s are stored in the personal profile storage means 605. The registration means 610 sets up a registration mechanism and a personal information profile for the representative 750. The authentication means 615 authenticates the representative 750 when he/she attempts to request an auditory archive. The categorization means 620 categorizes the representative 750s. The access/dispatch means 625 is used for providing the access of the generated auditory archive to the representative 750, or to directly dispatch the auditory archive to the corresponding representative 750. The access/dispatch means 625 also notifies the corresponding representative 750 that an audio archive has been generated. The particular operational flows of these components have been discussed above with respect to FIG. 3 and FIG. 4. It should be noted that the system 600 can be configured to implement the information requested embodiment and/or the information dispatch embodiment discussed above. The system 600 of FIG. 6 and its components can be implemented as hardware, software, or the combination thereof, and can be combined with other systems upon needed.

Referring now to FIG. 7, a schematic of the overall process for automatically generating an auditory archive and for providing an auditory archive to a representative 750 is shown according to an embodiment of the invention. FIG. 7 shows that a user 710 interacts with an IVR system 720. In particular, the user 710 is prompted by the IVR system 720 to enter or speak out specific information. For example, the user 710 inputs category selection information and audio recording information into the IVR system 720 through voice and/or keyboard. The IVR system 720 populates an information form 730 with the category choice information and the audio recording information as corresponding to the information inputted by the user. According to the category choice information and the audio recording information recorded on the information form 730, an auditory archive 740 is generated. The auditory archive 740 can then be accessed by an representative 750 on his/her own initiative, or the auditory archive 740 may be automatically dispatched to the corresponding requester 750. The representative 750 can also be notified that an auditory archive 740 has been created. Therefore, the representative 750 can then access the IVR 720 to obtain an auditory archive 740. After the representative 750 obtains the auditory archive and the information included therein the requester 750 can provide support to the user 710.

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for automatically generating auditory archives in a customer service environment, the method on an information processing system comprising:
    establishing a communication link with an end user;
    retrieving an information form file, wherein the information form file comprises at least a category choice information set and at least one audio recording information set;
    prompting, in response to the retrieving, the end user to answer a set of questions based on the category choice information set and the audio recording information set stored within the information form file;
    storing a data set associated with each answer to each question in the set of questions given by the end user, wherein at least a first data set is stored in the information form file in a storage area corresponding the category choice information set, and wherein at least a second data set is stored in the information form file in a storage area corresponding to the audio recording information set;
    combining the first and second data sets into a combined data set having a given sequence;
    generating auditory data representing the combined data set having the given sequence; and
    storing the auditory data that has been generated as an auditory archive file in a storage area of the information form file designated for audio archive files.

2. The method of claim 1, wherein the information form file further comprises at least one of an auditory archive information set, a time tag information set, and an index information set.

3. The method of claim 2, further comprising:
    generating time tag information corresponding to each information type in a set of information types within the auditory data of the audio archive file; and
    storing the time tag information into the time tag information set in the information form file.

4. The method of claim 2, wherein the generating further comprises:
    generating index information corresponding to the auditory data of the audio archive file; and
    storing the index information into the index information set in the information form file.

5. The method of claim 1, wherein the combining further comprises:
    determining that at least one of the first data set and second data set comprises data in a form of text; and
    converting the data in the form of text into an audio format.

6. The method of claim 1, wherein the prompting further comprising:
    prompting the end user to answer at least one question corresponding to the category information set via at least one of voice and keypad entry and at least one question corresponding to the audio recording set via voice.

7. The method of claim 1, wherein generating further comprises at least one of:
    adding at least one voice prompt to each of the first and second data sets that have been combined;
    deleting redundant voice information detected between each of the first and second data sets; and
    deleting intervals of silence greater than a given threshold.

8. An information processing system for automatically generating auditory archives in a customer service environment, the information processing system comprising:
    a memory;
    a processor communicatively coupled to the memory; and
    an Interactive Voice Response ("IVR") module communicatively coupled to the memory and the processor, wherein the IVR module is configured to perform a method comprising:
        retrieving an information form file, wherein the information form file comprises at least a category choice information set and at least one audio recording information set;
        prompting, in response to the retrieving, an end user to answer a set of questions based on the category choice information set and the audio recording information set stored within the information form file;
        storing one or more data set associated with each answer to each question in the set of questions given by the end user, wherein at least a first data set is a text-based data set and stored in the information form file in a first storage area corresponding to the category choice information set, and wherein at least a second data set is auditory-based data set and is stored in the information form file in a second storage area corresponding to the audio recording information set;

combining each data set, stored in the first and second storage areas into a combined data set having a given sequence;

generating auditory data representing the combined data set having the given sequence; and storing the auditory data that has been generated as an auditory archive file in a storage area of the information form file designated for audio archive files.

9. The information processing system of claim 8, wherein the information form file further comprises at least one of an auditory archive information set, a time tag information set, and an index information set.

10. The information processing system of claim 9, further comprising:

generating time tag information corresponding to each information type in a set of information types within the auditory data of the audio archive file; and storing the time tag information into the time tag information set in the information form file.

11. The information processing system of claim 9, wherein the generating further comprises:

generating index information corresponding to the auditory data of the audio archive file; and storing the index information into the index information set in the information form file.

12. The information processing system of claim 8, wherein the combining further comprises:

determining that at least one of the first data set and second data set comprises data in a form of text; and converting the data in the form of text into an audio format.

13. The information processing system of claim 8, wherein the prompting further comprises prompting the end user to answer at least one question corresponding to the category information set via at least one of voice and keypad entry and at least one question corresponding to the audio recording set via voice.

14. The information processing system of claim 8, wherein the generating further comprises adding at least one voice prompt to each data set that has been combined;

deleting redundant voice information detected between each data set; and deleting intervals of silence greater than a given threshold.

15. A computer program storage product for automatically generating auditory archives in a customer service environment, the computer program storage product comprising instructions for:

retrieving an information form file, wherein the information form file comprises at least a category choice information set and at least one audio recording information set;

prompting, in response to the retrieving, an end user to answer a set of questions based on the category choice information set and the audio recording information set stored within the information form file;

storing a data set associated with each answer to each question in the set of questions given by the end user, wherein at least a first data set is stored in the information form file in a storage area corresponding the category choice information set, and wherein at least a second data set is stored in the information form file in a storage area corresponding to the audio recording information set; combining the first and second data sets, into a combined data set having a given sequence;

generating auditory data representing the combined data set having the given sequence; and storing the auditory data that has been generated as an auditory archive file in a storage area of the information form file designated for audio archive files.

16. The computer program storage product of claim 15, wherein the information form file further comprises at least one of an auditory archive information set, a time tag information set, and an index information set.

17. The computer program storage product of claim 16, further comprising:

generating time tag information corresponding to each information type in a set of information types within the auditory data of the audio archive file; and storing the time tag information into the time tag information set in the information form file.

18. The computer program storage product of claim 15, wherein the instructions for combining further comprise instructions for:

determining that at least one of the first data set and second data set comprises data in a form of text; and converting the data in the form of text into an audio format.

19. The computer program storage product of claim 15, wherein the instructions for prompting further comprise instructions for:

prompting the end user to answer at least one question corresponding to the category information set via at least one of voice and keypad entry and at least one question corresponding to the audio recording set via voice.

20. The computer program storage product of claim 15, further comprising at least one of:

adding at least one voice prompt to each of the first and second data sets that have been combined;

deleting redundant voice information detected between each of the first and second data sets; and deleting intervals of silence greater than a given threshold, generating a set of time tag information corresponding to each information type in a set of information types within the auditory data of the audio archive file; and storing the set of time tag information into the time tag information set in the information form file.

* * * * *